(12) United States Patent
Mildenberger

(10) Patent No.: US 10,464,629 B2
(45) Date of Patent: Nov. 5, 2019

(54) SPRING-SUSPENDED BICYCLE HAND GRIP

(71) Applicant: Klaus Mildenberger, München (DE)

(72) Inventor: Klaus Mildenberger, München (DE)

(*) Notice: Subject to any disclaimer, the term of this patent is extended or adjusted under 35 U.S.C. 154(b) by 46 days.

(21) Appl. No.: 14/432,214

(22) PCT Filed: Oct. 22, 2013

(86) PCT No.: PCT/EP2013/072074
§ 371 (c)(1),
(2) Date: Mar. 30, 2015

(87) PCT Pub. No.: WO2014/064107
PCT Pub. Date: May 1, 2014

(65) Prior Publication Data
US 2015/0225037 A1 Aug. 13, 2015

(30) Foreign Application Priority Data

Oct. 22, 2012 (DE) .................. 10 2012 110 074

(51) Int. Cl.
B62K 21/26 (2006.01)
(52) U.S. Cl.
CPC .......... B62K 21/26 (2013.01); Y10T 74/20828 (2015.01)
(58) Field of Classification Search
CPC ................................ B62K 21/12; B62K 21/26
See application file for complete search history.

(56) References Cited

U.S. PATENT DOCUMENTS

| 583,457 | A |   | 6/1897  | Christy |
|---------|---|---|---------|---------|
| 599,793 | A | * | 3/1898  | Pihl ........................ B62K 21/14 74/551.2 |
| 1,258,647 | A |   | 3/1918  | Bowers |
| 1,568,911 | A |   | 1/1926  | O'Brien |
| 2,462,381 | A | * | 2/1949  | Gazda ................... B62K 21/14 74/551.2 |
| 3,752,006 | A | * | 8/1973  | Bartlett ................. B62M 25/00 74/489 |
| 3,995,650 | A | * | 12/1976 | DiVito .................... A61H 3/02 135/72 |

(Continued)

FOREIGN PATENT DOCUMENTS

AT 511268 A2 10/2012
DE 150513 C 5/1903
(Continued)

OTHER PUBLICATIONS

EPO Machine translation of FR 352117, Thierfelder, Aug. 1905.*
(Continued)

Primary Examiner — Vinh Luong
(74) Attorney, Agent, or Firm — David P. Dickerson

(57) ABSTRACT

A bicycle grip, comprising a grip element that has a support part, a holding element and a spring element, wherein the spring element and the holding element can be arranged inside a steering tube of a bicycle handlebar, wherein the spring element can be non-rotatably connected to the holding element and the grip element such that, when the support part exerts force against a spring force of the spring element, a rotational movement of the grip element can be performed around the tube central axis of the steering tube.

20 Claims, 3 Drawing Sheets

(56) References Cited

U.S. PATENT DOCUMENTS

| | | | | |
|---|---|---|---|---|
| 4,355,917 | A * | 10/1982 | Bunger | F02N 15/06 403/24 |
| 5,140,867 | A | 8/1992 | Smith | |
| 5,209,138 | A * | 5/1993 | Shu | B62K 21/14 267/150 |
| 6,419,601 | B1 * | 7/2002 | Kenner | A63B 49/08 473/552 |
| 8,117,942 | B2 * | 2/2012 | Kuwata | B62K 21/125 173/162.1 |
| 2007/0089559 | A1 * | 4/2007 | Franc | B62K 21/125 74/551.1 |
| 2010/0018338 | A1 * | 1/2010 | Mauch | B62K 23/04 74/488 |
| 2012/0234130 | A1 * | 9/2012 | Yu | B62K 21/26 74/551.9 |
| 2013/0185899 | A1 * | 7/2013 | Zhang | B25F 5/006 16/431 |
| 2015/0336628 | A1 * | 11/2015 | Miyazaki | B62K 23/06 74/551.9 |
| 2017/0057589 | A1 * | 3/2017 | Moeschler | B62K 21/12 |
| 2018/0154975 | A1 * | 6/2018 | Oshiro | B62K 23/04 |
| 2018/0185739 | A1 * | 7/2018 | McGowan | A63C 17/011 |

FOREIGN PATENT DOCUMENTS

| | | | |
|---|---|---|---|
| DE | 473694 | C | 3/1929 |
| DE | 802424 | C | 2/1951 |
| DE | 826829 | C | 1/1952 |
| DE | 837812 | * | 5/1952 |
| DE | 947265 | * | 8/1952 |
| DE | 20311740 | U1 | 11/2003 |
| DE | 202004008297 | U1 | 1/2005 |
| FR | 352117 | A | 8/1905 |
| FR | 634562 | A | 2/1928 |
| FR | 645661 | A | 10/1928 |
| WO | 2005115824 | A1 | 12/2005 |

OTHER PUBLICATIONS

EPO Machine translation of DE 150513, Thierfelder, 5, 1903.*
EPO Machine translation of DE 20311740, Ulrich, Nov. 2003.*
Define torsion—Google Search, google.com., Aug. 12, 2017.*
Define thenar—Google Search, google.com., May 29, 2018 (Year: 2018).*
Define palm of hand—Google Search, google.com., May 27, 2018 (Year: 2018).*
English translation of the International Search Report (ISR) with regard to PCT/EP2013/072074 as completed by the EPO on Nov. 26, 2013 and dated Dec. 4, 2013.
Written Opinion of the ISA issued with regard to PCT/EP2013/072074.
Office Action issued by the German Patent and Trademark Office dated Apr. 30, 2013 with regard to priority application DE 10 2012 110 074.
Office Action issued by the German Patent and Trademark Office dated Feb. 17, 2014 with regard to priority application DE 10 2012 110 074.
Office Action issued by the German Patent and Trademark Office dated Feb. 26, 2015 with regard to priority application DE 10 2012 110 074.

* cited by examiner

SPRING-SUSPENDED BICYCLE HAND GRIP

FIELD OF INVENTION

The present invention relates to a bicycle grip for a handlebar of a bicycle, wherein the grip comprises particularly a wing shape.

BACKGROUND OF THE INVENTION

On a bicycle, the two bicycle grips are the only connection human/machine where the human skin comes unprotected and constantly in contact with the bicycle. Almost all grips are cylindrical and need to be enclosed and held by a hand, leading over time to fatigue and being uncomfortable. Road impact directly affects the hands, arms, and shoulders. Manufacturers try to create a higher comfort level by using various materials. Some grips have so called thenar rests, particularly a wing-like bulge on the outer surface of the grip. Often, however, the grip is simply slid onto the handle bar. In this case, the wing can be twisted under load and become unusable. To avoid this problem, grips have an outer clamping that prevents the twisting. For these grips, in particular a composite material provides a desired damping and light spring action. A disadvantage of different plastic materials may be a decomposition especially of the softer plastic material caused by sweat from the hand and, further, unsightly dirt deposits on the grip and on the hand. Furthermore, the spring action of known grips is rather low, in particular not or barely recognizable.

From the DE 20 2004 008 297 U1, a bicycle grip having a wing shape and comprising a soft and a solid layer of plastic material is known, which comprises a minimum of suspension from the grip material itself.

SUMMARY OF THE INVENTION

It is an object to provide a bicycle grip having an improved spring action. In particular, it is an object to provide a bicycle grip where the suspension of the bicycle grip is realized independently from the material of the grip element.

According to a first exemplary embodiment of the invention a bicycle grip is proposed for achieving the object, the bicycle grip, comprising a grip element that has a support part, a holding element, and a spring element, wherein the spring element und the holding element can be arranged inside a steering tube of a bicycle handlebar, wherein the spring element is non-rotatably connectable to the holding element and the grip element, such that by application of a force to the support part against a spring force of the spring element, a rotational movement of the grip element about the tube center axis of the steering tube is executable.

The invention reduces or overcomes the above mentioned drawbacks with the features of the independent claim. Further advantageous embodiments are specified in the dependent claims.

In particular, it is provided to design the shape of the support part such that the grip element comprises a wing type shape. In particular, the right choice of a wing shape allows that the hands, respectively, can rest comfortably with the entire surface. Preferred is a shape with an area that is at least by factor 1.1 larger as that of currently known wing shapes to arrange a force that has an impact on the support surface with a larger lever. In known systems, the size of the thenar support does not matter in this context.

According to an embodiment of the invention, it is provided that the grip element can be rotated by hand about the center axis of the steering tube against the spring force from an initial position, in which no force is applied to the grip element, by at least 10 degrees, preferably by at least 15 degrees, and more preferably by at least 20 degrees. The resilient rotatability of the grip to the named maximal deflection is carried out under maximum hand load by the driver and, thus, depends from the weight and force of the driver. Potholes, curbs, and similar obstacles that appear can be absorbed or attenuated by the resilient rotatability while the thenar regions still rest on the wings. Due to the separation of the spring force and the material of the grip element, materials can be used for the first time that so far due to their hardness where not suited. Advantageous is particularly an ergonomically formed bicycle grip in the shape of a wing grip with large thenar rests that is spring-mounted.

According to an embodiment, the grip element is made of wood. Preferably, the wood is finely sanded and oiled. Wood has a noticeably more pleasant feel compared to other materials such as rubber, etc. In particular, the use of wood also results in less or no deposits and soiling. A plastic material that is very dense and smooth is also feasible as material for the grip element to reach the above mentioned requirements. In particular, it is possible to use the surfaces of the grip element for advertisements for companies, for instance by dying the material in company logo colors and patterns.

Particularly advantageous is the use of wood grips, since a pleasant feel encounters a great spring suspension comfort. The proposed spring system has further a feature that enables a broad application to many classes of bikes; contrary to suspension forks, the suspension effect can be activated or deactivated. The spring system is activated when the thenar regions rest with a relaxed wrist on the grip element and can be deactivated by tensing the wrists. Accordingly, a very direct connection with the bicycle grip is developed.

Every driver can in accordance with a particular embodiment adjust the effect of the spring element individually. In particular, the spring force can be adjusted by adjusting the length of the spring and, thus, of the spring element.

Preferably, the spring element can be rod-shaped and comprise, in particular, a polygonal profile, preferably, a square profile.

According to an embodiment of the invention, the bicycle grip further comprises a holding element, for example, in form of a mount, for securing the spring element at an end and an adjustment means, for example, in form of a block, for adjusting the spring force of the spring element.

Preferably, in accordance with an embodiment of the invention, the adjustment means is movable relative to the spring element in axial direction of the spring element and torque proof to the spring element.

Furthermore, it is preferred in accordance with a further embodiment that the grip element is movable relative to the steering tube from an initial position, in which no force is applied to the grip element, to an fixation position, such that the grip element is gradually adjustable relative to the steering tube in a plurality of attack angles and fixable on the steering tube. This allows an accurate radial adjustment of the position of the support surfaces.

The individual embodiments of the invention can of course be combined with each other, which may partially develop beneficial effects that may go beyond the sum of individual effects.

BRIEF DESCRIPTION OF THE DRAWINGS

Further details and advantages of the invention will become apparent from the exemplary embodiments illustrated in the drawing. Shown are highly schematic FIG. 1A an exploded schematic drawing of a bicycle grip, FIG. 1B an alternative, schematic exploded depiction of the bicycle grip of FIG. 1A, FIG. 2A a schematic drawing of the bicycle grip of FIG. 1A, and FIG. 2B a schematic drawing of the bicycle grip of FIG. 2A in a rotationally displaced state.

DETAILED DESCRIPTION OF EXEMPLARY EMBODIMENTS

Figure 1A:
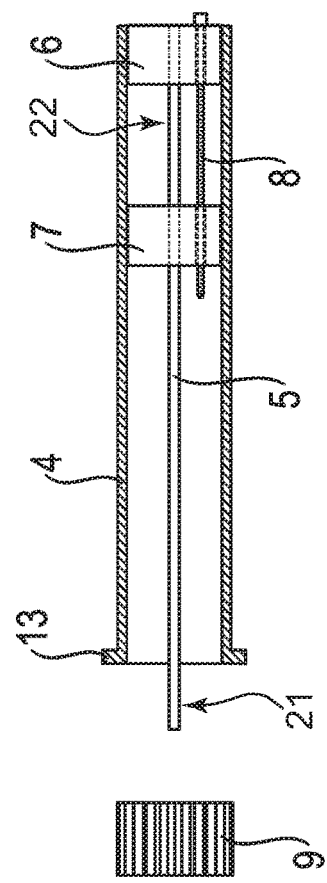
Figure 1A:
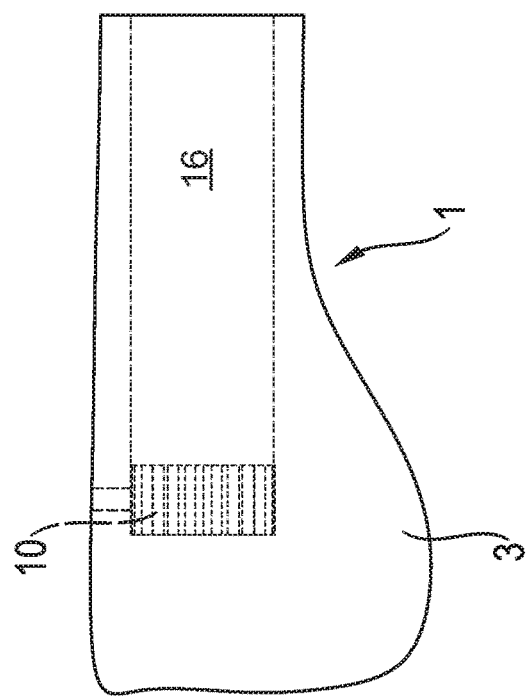
Figure 1B:
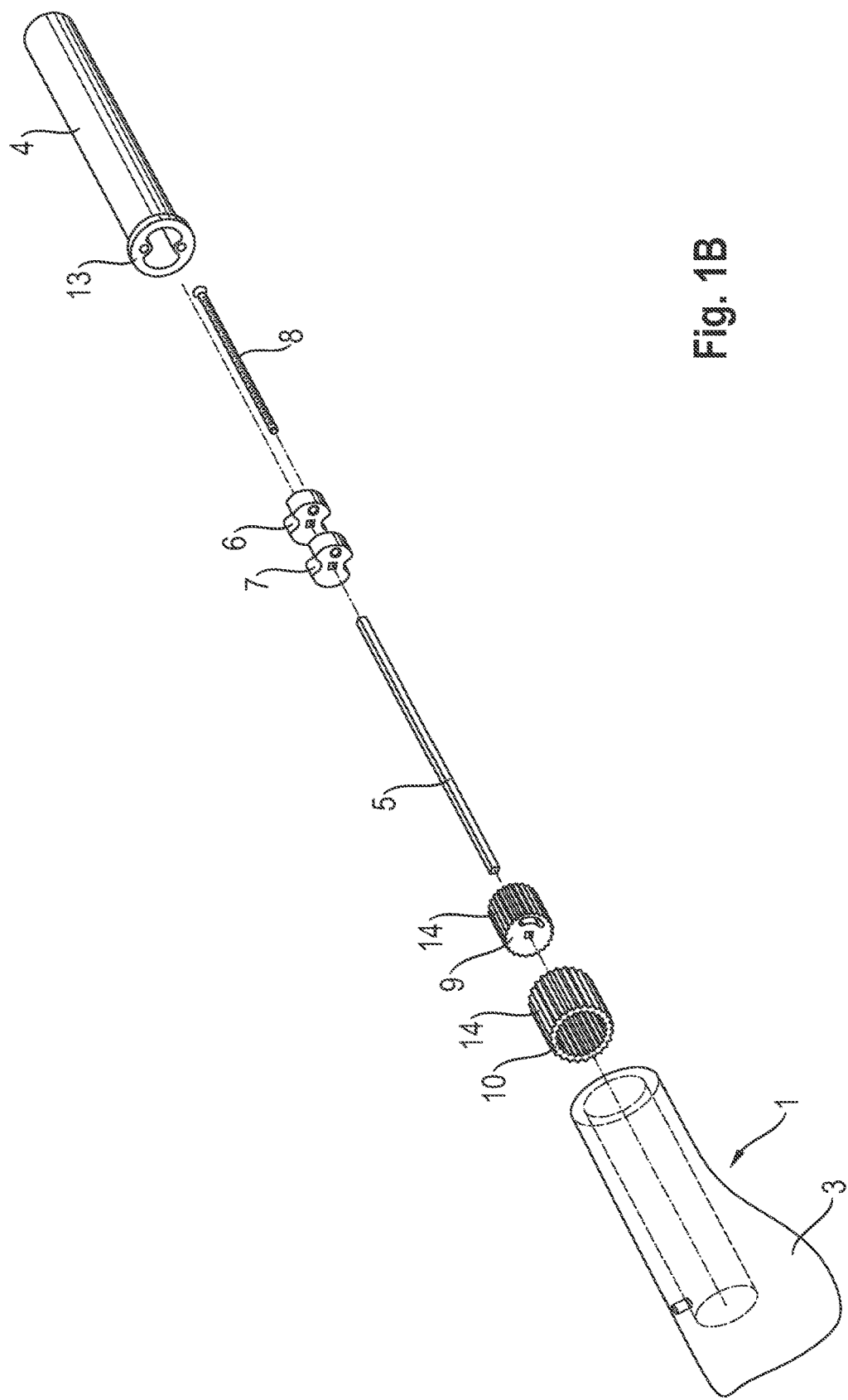

Each of FIGS. 1A and 1B shows in an exploded schematic drawing a curved grip element 1 in form of a bicycle wing grip including a support part 3 for an improvement of the thenar rest. As depicted, grip element 1 comprises a tubular hollow 16. To mount the grip element 1 resilient at a steering tube, a holding element 4, which is fixable in the steering tube, for example, bonded or screwed, or formed as a part of the steering tube, and a torsion rod 5 as a spring element, which extends the steering tube and is secured on a mount 6 that is permanently connected with the holding element 4, are provided.

Within the holding element 4 a block 7 is movably positioned. The block 7 influences the resilience of the torsion rod 5 in a known way by increasing or reducing the spring length. The influence is caused by enlargement or reduction of the free length of the torsion rod 5. The free length can be adjusted frontal with screw 8. The torsion rod 5 has a profile that enables the positive connection with the clutch shaft 9. The profile is preferably a square profile. The clutch shaft 9 is designed such that the wing shaped grip element 1 can be secured at various rotation angles. This is enabled, for example, by providing the grip element 1 on the outside with a fine gearing 14 and by providing the inside the grip positioned clutch bearing 10 with a corresponding inner gearing.

Further possible is a helical formed torsion rod that enables fine tuning the grip angle with a minimal axial displacement of the grip for a couple of millimeters.

The final fixation of the grip element 1 on the steering tube is carried out by sliding the grip element 1 on the steering tube until the gearing 14 grips and by a following clamping utilizing a set screw or similar.

The rotatably mounted wing-shaped support part 3 as part of the grip element 1 receives its suspension from the torsion rod 5 that is fixed to the steering tube by means of the holding element 4 and mount 6. The torsion rod 5 is on the grip side connected with the clutch shaft 9 and the clutch bearing 10. Through this suspension, road impact while riding the bicycle will not anymore be directly transferred to the arms of the driver or a sudden bending of the upper body is cushioned by a yielding of the torsion rod. The torsional stiffness can be controlled by a sliding of the block 7 and can be set by using a screw 8. The exact position of the wing of the grip or its support part 3 can be set by sliding the grip element 1 onto the gearing of the clutch shaft 9 and the clutch bearing 10 at different radial positions.

As reflected in FIG. 1A, a first portion 21 of torsion rod 5 may be connected on the grip side with the clutch shaft 9 and the clutch bearing 10, and a second portion 22 of the torsion rod 5 may be fixed to the steering tube by means of the holding element 4 and mount 6.

Figure 2A:
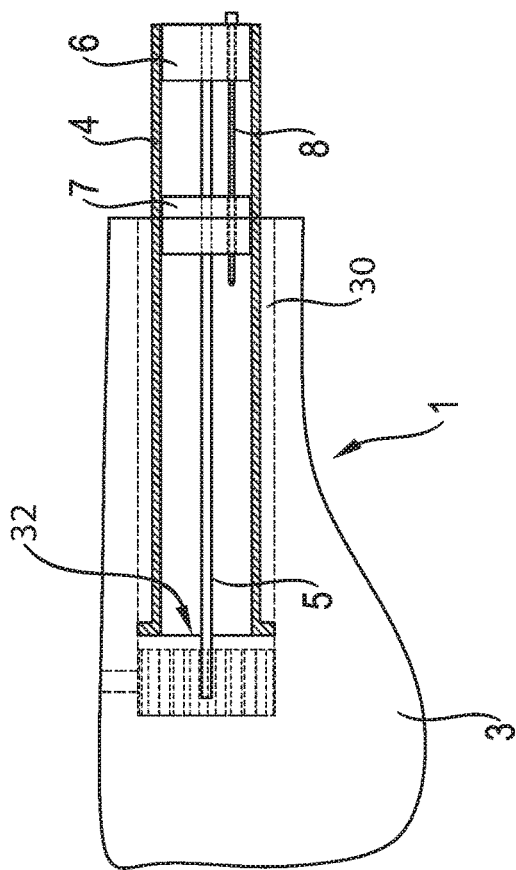
Figure 2B:
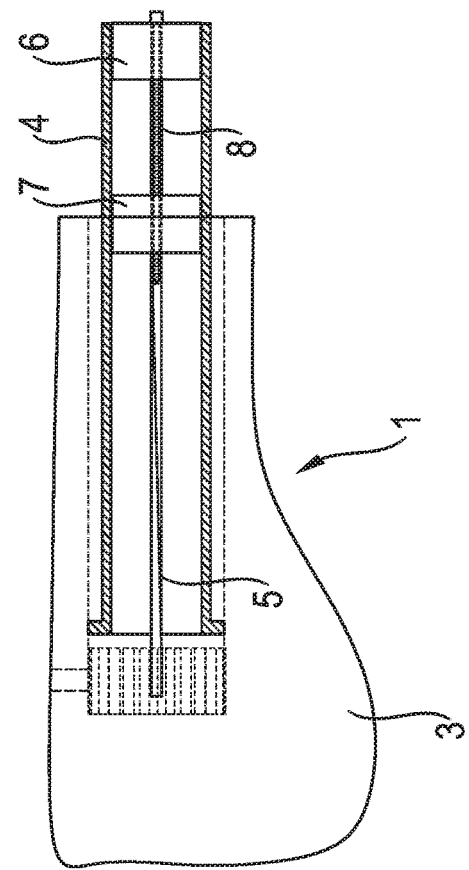

FIG. 2A schematically depicts the bicycle grip of FIG. 1A. FIG. 2B schematically depicts bicycle grip of FIG. 2A in a rotationally displaced state, a rotational displacement of grip element 1 relative to the tubular holding element 4 effecting a torsion of torsional spring 5.

FIG. 2A depicts a gap 30 between an outer circumference of holding element 4 (which is fixable in a steering tube) and an inner circumference of a tubular hollow in grip element 1 (which can be fixed on the steering tube). In FIG. 2A, reference sign 32 generally designates an end of holding element 4 that extends most deeply into the tubular hollow in grip element 1.

It should be noted that the term "comprise" does not exclude further elements or method steps, as well as the term "a" or "an" does not exclude several element or steps.

The used reference numbers only serve for increasing the comprehensibility and should not be viewed as limiting in any case, while the scope of the invention is represented by the claims.

The invention claimed is:

1. A bicycle handlebar grip, comprising:
   a grip element having a tubular hollow;
   a substantially tubular body;
   a mount fixedly connected to said tubular body; and
   a torsional spring, wherein
   said torsional spring is fixed to said mount,
   said tubular body extends into said tubular hollow,
   said torsional spring extends along a central longitudinal axis of said tubular body,
   said grip element is asymmetric relative to a longitudinal axis of said tubular hollow,
   said grip element is interconnected to said tubular body via said torsional spring such that a rotational displacement of said grip element relative to said tubular body effects a torsion of said torsional spring.

2. The handlebar grip of claim 1, wherein:
   said grip element is wooden.

3. The handlebar grip of claim 1, comprising:
   a spring adjustment element, slidably situated within said tubular body, for adjusting a stiffness of said torsional spring.

4. The handlebar grip of claim 3, wherein:
   said spring adjustment element is slidable in an axial direction of said torsional spring to adjust said stiffness of said torsional spring by adjusting a length of said torsional spring.

5. The handlebar grip of claim 3, comprising:
   a screw that adjusts a position of said spring adjustment element in an axial direction of said torsional spring, wherein
   a longitudinal axis of said screw is substantially parallel to a longitudinal axis of said torsional spring.

6. The handlebar grip of claim 1, wherein:
   said rotational displacement of said grip element relative to said tubular body effects said torsion of said torsional spring between a first portion of said torsional spring that is connected to and rotates with said grip element and a second portion of said torsional spring that is connected to and rotates with said tubular body.

7. The handlebar grip of claim 1, wherein:
   an asymmetric wing portion of said grip element provides thenar support.

8. The bicycle handlebar grip of claim 1, wherein:
   said torsional spring is a torsion rod having a square cross-section.

9. The bicycle handlebar grip of claim 1, comprising:
a gap between an outer circumference of said tubular body and an inner circumference of said tubular hollow.
10. The bicycle handlebar grip of claim 1, wherein:
said torsional spring protrudes out of an end of said tubular body that extends most deeply into said tubular hollow.
11. The bicycle handlebar grip of claim 1, comprising:
a toothed connector that connects said torsional spring to said grip element.
12. The bicycle handlebar grip of claim 1, comprising:
a connector, situated outside said tubular body, that connects said torsional spring to said grip element.
13. A bicycle handlebar grip, comprising:
a grip element having a tubular hollow;
a substantially tubular body;
a torsional spring;
a screw, a longitudinal axis of said screw being substantially parallel to a longitudinal axis of said torsional spring; and
a spring adjustment element for adjusting a stiffness of said torsional spring, wherein
said tubular body extends into said tubular hollow,
said torsional spring is a torsion rod that extends along a central longitudinal axis of said tubular body,
said grip element is asymmetric relative to a longitudinal axis of said tubular hollow,
said grip element is interconnected to said tubular body via said torsional spring such that a rotational displacement of said grip element relative to said tubular body effects a torsion of said torsional spring,
said spring adjustment element is slidably situated within said tubular body, and
a rotation of said screw effecting a sliding of said spring adjustment element, which sliding effects an adjustment of said stiffness of said torsional spring.
14. The handlebar grip of claim 13, wherein:
an asymmetric wing portion of said grip element provides thenar support.
15. A bicycle handlebar grip, comprising:
a grip element having a tubular hollow;
a substantially tubular body;
a torsional spring;
a mount; and
a block slidably situated in said tubular body, wherein
said torsional spring is fixedly connected to said tubular body via said mount,
said tubular body extends into said tubular hollow,
said torsional spring is a torsion rod that extends along a central longitudinal axis of said tubular body,
said grip element is asymmetric relative to a longitudinal axis of said tubular hollow,
said grip element is interconnected to said tubular body via said torsional spring such that a rotational displacement of said grip element relative to said tubular body effects a torsion of said torsional spring, and
a sliding of said block relative to said tubular body alters a stiffness of said torsional spring by altering a free length of said torsional spring.
16. The bicycle handlebar grip of claim 15, comprising:
a gap between an outer circumference of said tubular body and an inner circumference of said tubular hollow.
17. The bicycle handlebar grip of claim 15, wherein:
said torsional spring protrudes out of an end of said tubular body that extends most deeply into said tubular hollow.
18. The bicycle handlebar grip of claim 15, comprising:
a toothed connector that connects said torsional spring to said grip element.
19. The bicycle handlebar grip of claim 15, comprising:
a connector, situated outside said tubular body, that connects said torsional spring to said grip element.
20. The bicycle handlebar grip of claim 15, wherein:
in all operating states of said bicycle handlebar grip, said block contacts an inner surface of said tubular body.

* * * * *